US007725091B2

(12) United States Patent
Legouable et al.

(10) Patent No.: US 7,725,091 B2
(45) Date of Patent: May 25, 2010

(54) METHOD AND DEVICE FOR TRANSMITTING A SIGNAL IN A MULTI-ANTENNA SYSTEM, SIGNAL, AND METHOD FOR ESTIMATING THE CORRESPONDING TRANSMISSION CHANNELS

(75) Inventors: Rodolphe Legouable, Cesson-Sevigne (FR); Vincent Le Nir, Flers (FR); Maryline Helard, Rennes (FR); Jean-Michel Auffray, Bourg la Reine (FR); Jean-Francois Helard, Rennes (FR)

(73) Assignee: France Telecom, Paris (FR)

( * ) Notice: Subject to any disclaimer, the term of this patent is extended or adjusted under 35 U.S.C. 154(b) by 744 days.

(21) Appl. No.: 11/587,256

(22) PCT Filed: Apr. 19, 2005

(86) PCT No.: PCT/FR2005/000965

§ 371 (c)(1),
(2), (4) Date: Jan. 12, 2007

(87) PCT Pub. No.: WO2005/112329

PCT Pub. Date: Nov. 24, 2005

(65) Prior Publication Data
US 2007/0238420 A1    Oct. 11, 2007

(30) Foreign Application Priority Data
Apr. 23, 2004    (EP)    .................... 04364035

(51) Int. Cl.
*H04B 1/06*    (2006.01)

(52) U.S. Cl. .................... 455/277.1; 455/101; 455/272; 375/299

(58) Field of Classification Search ................. 455/272, 455/277.1, 276.1, 269, 275, 562.1, 101; 375/299, 375/347
See application file for complete search history.

(56) References Cited

U.S. PATENT DOCUMENTS

| | | | | |
|---|---|---|---|---|
| 6,145,110 | A | * | 11/2000 | Khayrallah ............... 455/277.1 |
| 6,226,330 | B1 | * | 5/2001 | Mansur ...................... 375/257 |
| 6,307,882 | B1 | | 10/2001 | Marzetta ..................... 375/224 |

(Continued)

OTHER PUBLICATIONS

C. Yuen et al., "Decoding of Quasi-Orthogonal Space-Time Block Code with Noise Whitening," 14th IEEE 2003 Internat'l Sym. of Personal Indoor and Mobile Radio Comm. Proceedings, vol. 2, Sep. 2003, pp. 2166-2170.

(Continued)

*Primary Examiner*—Lana N Le
(74) *Attorney, Agent, or Firm*—David D. Brush; Westman, Champlin & Kelly P.A.

(57) ABSTRACT

A method for transmitting a digital signal via n transmit antennas, wherein n is strictly greater than 2, comprising the steps of combining with a source data vector n vectors to be transmitted respectively by each of the transmit antennas by a coding matrix <I>M</I> with a yield equal to 1, using reference symbols known to at least one receiver whereby it is able to estimate at least three transmission channels corresponding respectively to each of said transmit antennas. Said coding matrix <I>M</I> applied a mathematical transformation to the reference symbols prior to the transmission thereof.

9 Claims, 6 Drawing Sheets

U.S. PATENT DOCUMENTS 7,219,289 B2 * 5/2007 Dickson ............... 455/101
7,356,090 B2 * 4/2008 Hwang et al. ............... 375/295

OTHER PUBLICATIONS

O. Tirkkonen et al., "Minimal Non-Orthogonality Rate 1 Space-Time Block Code for 3+ Tx Antennas," IEEE $6^{th}$ Int. Symp. On Spread-Spectrum Tech. & Applic., vol. 2, Sep. 2000, 429-432.

H. Jafarkhani, "A Quasi-Orthogonal Space-Time Block Code," 2000 IEEE, vol. 1, Sep. 2000, pp. 42-45.

A.F. Naguib et al., "Space-Time Coded Modulation for High Data Rate Wireless Communications," 1997 Globecom, IEEE. Nov. 1997, pp. 102-109.

A. Hottinen et al., "A Randomization Technique for Non-Orthogonal Space-Time Block Codes," VTC 2001, IEEE VTS $53^{rd}$, Vehicular Technology Conference, May 2001, IEEE US vol. 2, Conf. 53, pp. 1479-1482.

S. Alamouti, "A Simple Transmit Diversity Technique for Wireless Communications," IEEE Journal on Select Areas in Comm., vol. 16, No. 8, Oct. 1998, pp. 1451-1458.

V. Tarokh et al., "Space-Time Block Codes from Orthogonal Designs," IEEE Transactions on Information Theory, vol. 45, No. 5, Jul. 1999, pp. 1457-1467.

I. Barhumi et al., "Pilot Tone Based Channel Estimation in OFDM Systems with Transmitter Diversity in Mobile Wireless Channels," Proceedings of the Prog. for Research on Integrated Syst. and Circuits (ProRISC), Nov. 2001, pp. 1-8.

C. Fraghouli, "Training-Based Channel Estimation for Multiple-Antenna Broadband Transmission," IEEE Transactions on Wireless Comm., vol. 2, No. 2, Mar. 2003, pp. 384-391.

H. Jafarkhani, "A Quasi-Orthogonal Space-Time Block Code," IEEE Trans. on Comm., vol. 49, No. 1, Jan. 2001, pp. 1-4.

R.A. Stirling-Gallacher et al., Improving Performance of Coherent Coded OFDM Systems Using Space Time Transmit Diversity, Electronics Letters, vol. 37, No. 7, Mar. 2001, pp. 1-2.

R.A. Stirling-Gallacher et al., "Practical Pilot Patterns for Coherent Coded OFDM Systems Using Space Time Transmit Diversity," European Wireless 2002 Conf., Feb. 2002, pp. 1-4.

* cited by examiner

METHOD AND DEVICE FOR TRANSMITTING A SIGNAL IN A MULTI-ANTENNA SYSTEM, SIGNAL, AND METHOD FOR ESTIMATING THE CORRESPONDING TRANSMISSION CHANNELS

CROSS-REFERENCE TO RELATED APPLICATION

This Application is a Section 371 National Stage Application of International Application No. PCT/FR2005/000965, filed Apr. 19, 2005 and published as WO 2005/112329 on Nov. 24, 2005, not in English.

FIELD OF THE DISCLOSURE

The field of the disclosure is that of digital communications by wireless. More specifically, the disclosure relates to the transmission and reception, and especially the estimation of transmission channels in a MIMO ("Multiple Input Multiple Output") type or MISO ("Multiple Input Single Output") type multiple-antenna system, through the transmission of signals subjected to a space-time and/or space-frequency encoding.

More specifically again, the invention can be applied to multi-antenna systems implementing several transmit antennas, in particular more than two transmit antennas. The signals comprise reference symbols, known to at least one receiver and enabling this receiver to estimate the transmission channels corresponding to each of the transmit antennas.

An example of an application of an embodiment of the invention is in the field of radio communications, especially for third, fourth and subsequent generation systems.

An embodiment of the invention can be applied to uplink communications (from a terminal to a base station) as well as to downlink communications (from a base station to a terminal).

BACKGROUND

There are several and known techniques of estimation of transmission channels in a multi-antenna system comprising several transmit antennas.

Most of these estimation techniques are limited to the application of a space-time encoding or space-frequency encoding in OFDM-type multi-carrier systems.

Thus, the first systems proposed all used orthogonal space-time block codes.

Alamouti in "A Simple Transmit Diversity Technique for Wireless Communications", IEEE Journal on Selected Areas in Communications, pp. 311-335, vol. 6, 1998, presented the first system using an orthogonal space-time block code of rate 1 (where rate is defined as the ratio between the number N of symbols transmitted and the number L of symbol times during which they are transmitted) for two transmit antennas.

A major drawback of Alamouti's orthogonal space-time codes is that they are limited to two-transmit-antenna systems and that it is not possible to extend their use directly to a system with more than two transmit antennas while keeping an unitary rate.

Tarokh and al. ("Space-time Block Codes from Orthogonal Designs", IEEE Transactions on Information Theory, 1999, 45, (5), pp. 1456-1467) then extended the orthogonal space-time block codes to systems comprising three or four transmit antennas. However, the rates R=N/L obtained were only ½ or ¾.

One drawback of Tarokh's orthogonal space-time codes therefore is that, although they are adapted to systems implementing a greater number of transmit antennas (three or four antennas), they have a rate of less than 1.

Barhumi and al. in "Pilot Tone-based Channel estimation for OFDM Systemes with Transmitter Diversity in Mobile Wireless Channels" then proposed a channel estimation technique for multi-antenna OFDM (SISO-OFDM or MIMO-OFDM) systems relying on a classic OFDM channel estimation system, implementing an extinction of certain carriers. However, one drawback of this estimation technique in a MIMO system is that the insertion of reference symbols generally causes major loss of spectral efficiency whenever, for each transmit antenna, a reference symbol is transmitted on a reference carrier at a given point in time while no data whatsoever is transmitted on the other carrier or carriers so as not to disturb the estimation of the transmission channel.

Other research was subsequently conducted by Fragouli and al. in "Training Based Channel Estimation for Multiple-Antenna Broadband Transmissions" on the learning sequences that can be used for channel estimation for multi-antenna systems.

Subsequently, Stirling-Gallacher and al. ("Improving performance of coherent coded OFDM systems using space time transmit diversity", Electronics Letters, Vol. 37 N, March 2001, "Practical Pilot Patterns coherent coded OFDM systems using space time transmit diversity", European Wireless 2002 conference, 25-28 Feb. 2002, Florence) envisaged a channel estimation technique for MIMO-OFDM systems, restricted to two-transmit-antenna systems using orthogonal space-time codes of the Alamouti or Tarokh type.

One drawback of this estimation technique is that the number of transmit antennas of the transmission system is limited by the use of prior-art orthogonal space-time block codes.

Thus, according to the prior-art techniques, there are no complex orthogonal unit-rate codes for systems having more than two transmit antennas. This diminishes spectral efficiency.

SUMMARY

An embodiment of the invention relates to a method for transmitting a digital signal via n transmit antennas, n being strictly greater than 2, in which n vectors to be transmitted respectively by each of said transmit antennas are associated with a source data vector by means of an encoding matrix M of rate equal to 1, using reference symbols known to at least one receiver and enabling this receiver to estimate at least three transmission channels respectively corresponding to each of said transmit antennas.

According to an embodiment of the invention, said reference symbols of a transmission method of this kind undergo a mathematical transformation by said encoding matrix M before they are transmitted.

Thus, an embodiment of the invention relies on an entirely novel and inventive approach to the transmission of a digital signal, implementing an encoding matrix in a multi-antenna system with more than two transmit antennas.

More specifically, an embodiment of the invention proposes the transmission, on the n transmit antennas, of the reference symbols of the encoding matrix M of rate equal to 1, a vector of reference symbols being associated with the encoding matrix M by means of an encoding function.

Such an encoding matrix M of rate equal to 1 corresponds either to a non-orthogonal matrix or to a block orthogonal matrix, the rate being defined as the ratio between the number of symbols transmitted and the number of symbols times during which they are transmitted.

Advantageously, the reference symbols are distributed in space and in time and/or in space and in frequency.

The encoding matrix then implements a space-time encoding and/or space-frequency encoding.

According to a first embodiment, the encoding matrix includes at least two blocks, each of the blocks being orthogonal.

Preferably, each of the blocks of reference symbols is transmitted separately, each of the blocks being transmitted on certain transmit antennas, the other transmit antennas being powered off.

Thus, the data transmitted by a first set of antennas are not disturbed by the data transmitted by another set of antennas, the other set of antennas not transmitting on the same carriers at the same point in time.

According to another embodiment of the invention, called a third embodiment, the transmission method comprises a step of selection between a frequency distribution and a time distribution.

In particular, this selection step may take account of the characteristics of a transmission channel.

According to another embodiment of the invention, called a second embodiment, the reference symbols are transmitted on all the transmit antennas after mathematical transformation by the encoding matrix M.

Thus, the encoding matrix M is a comprehensively non-orthogonal matrix.

In particular, the encoding matrix M may be obtained by a Jafarkhani type encoding and has the form:

$$M = \begin{bmatrix} x_1 & x_2 & x_3 & x_4 \\ -x_2^* & x_1^* & -x_4^* & x_3^* \\ -x_3^* & -x_4^* & x_1^* & x_2^* \\ x_4 & -x_3 & -x_2 & x_1 \end{bmatrix},$$

where $x_i$ is a reference symbol and $x_i^*$ is a conjugate reference symbol with i being a relative integer, $1 \leq i \leq 4$.

An embodiment of the invention also relates to corresponding transmit device.

As indicated here above, an embodiment of the invention can thus be applied to uplink communications, a transmit device then corresponding to a terminal (or being included in a terminal), as well as to downlink communications, a transmit device corresponding, in this case, to a base station (or being included in a base station).

An embodiment of the invention also relates to a digital signal formed by n vectors respectively transmitted by means of n transmit antennas, n being strictly greater than 2.

According to an embodiment of the invention, the signal comprises encoded reference symbols, obtained after mathematical transformation of reference symbols by an encoding matrix M of unitary rate, so as to enable the estimation, in a receiver, of at least three transmission channels respectively corresponding to each of the transmit antennas.

An embodiment of the invention also relates to method of estimation of the transmission channels in a multi-antenna system implementing n transmit antennas, where n is strictly greater than 2, and at least one reception antenna. According to this method, n vectors to be transmitted respectively by each of said transmit antennas are associated with a vector of source data, by means of an encoding matrix M, implementing reference symbols known to at least one receiver and enabling this receiver to estimate at least three transmission channels corresponding respectively to each of the transmit antennas.

According to an embodiment of the invention, such an estimation method comprises a step of reception of a received reference vector, corresponding to a transmitted reference vector obtained by the multiplication of reference symbols by said encoding matrix M, and modified by at least one transmission channel for each of the transmit antennas. For each of said reception antennas, the received reference vector undergoes a mathematical transformation by a decoding matrix, which is the inverse of the encoding matrix and takes account of the effect of a transmission channel associated with the reception antenna, to give an estimation of the effects of the transmission channels on the reference symbols.

Thus, an embodiment of the invention relies on an entirely novel and inventive approach to channel estimation in a multi-antenna system with more than two transmit antennas. It will be noted that this approach is also novel in a system with two transmit antennas.

Indeed, the estimation of the different transmission channels is implemented from reference symbols known to at least one receiver, a vector of reference symbols being associated with an encoding matrix M by means of an encoding function.

With the vector of reference symbols and the encoding matrix M used being known, it is possible to estimate the different transmission channels from the inverse of the encoding matrix, corresponding to the decoding matrix.

Thus, from reference symbols and the encoding technique used, a reception device may implement techniques of decoding, filtering or equalization, and a recombination of the signals coming from the various antennas, in order to estimate the different transmission channels.

Advantageously, the decoding matrix is an inverse matrix integrating an equalization in the sense of the MMSE ("Minimum Mean Squared Error") or ZF ("Zero Forcing") criterion.

In particular, the criterion implemented may be the MMSE criterion. The decoding matrix is then formed by the elements:

$$\hat{h} = \frac{M^H}{M^H M + \frac{I}{\gamma}} r,$$

The criterion implemented may also be the ZF criterion. The decoding matrix is then formed by the elements:

$$\hat{h} = \frac{M^H}{M^H M} r,$$

with:
r being the received reference vector;
M the encoding matrix;
I the unitary matrix;
$\gamma$ the signal-to-noise ratio;
$^H$ the conjugate transpose.

Preferably, the estimation method comprises an interpolation step delivering an estimation of the transmission channels for each of the payload data from the estimation of the reference symbols.

In particular, the interpolation step is noteworthy in that it implements a temporal interpolation and/or a frequency interpolation.

This interpolation step may belong to the group comprising:
- linear interpolations;
- Wiener interpolations.

Another embodiment of the invention relates to a reception device in a multi-antenna system implementing n transmit antennas, where n is strictly greater than 2, and at least one reception antenna, in which n vectors to be transmitted respectively by each of said transmit antennas are associated with a vector of source data, by means of an encoding matrix M, implementing reference symbols known to said receiver and enabling this receiver to estimate n transmission channels corresponding respectively to each of said transmit antennas.

Such a reception device comprises means of reception of a received reference vector, corresponding to a transmitted reference vector obtained by the multiplication of reference symbols by said encoding matrix M, and modified by at least one transmission channel for each of the transmit antennas. For each of said reception antennas, the received reference vector undergoes a mathematical transformation by a decoding matrix, which is the inverse of the encoding matrix and takes account of the effect of a transmission channel associated with the reception antenna, to give an estimation of the effects of the transmission channels on the reference symbols.

As indicated here above, an embodiment of the invention can be applied to uplink communications, the reception device then corresponding to a base station (or being included in a base station), as well as to downlink communications, the reception device corresponding in this case to a terminal (or being included in a terminal).

Other features and advantages shall appear more clearly from the following description of a preferred embodiment, given by way of a simple, illustrative and non-exhaustive example, and from the appended drawings.

DETAILED DESCRIPTION OF ILLUSTRATIVE EMBODIMENTS

The general principle of an embodiment of the invention relies on the association of an encoding matrix M with a vector of reference symbols, known to at least one receiver, so as to enable the estimation, in the receiver, of the different propagation channels between more than two transmit antennas and a reception antenna.

This encoding matrix M is either non-orthogonal or block orthogonal and has a rate equal to 1, the rate being defined as the ratio between the number of symbols transmitted and the number of symbol times during which they are transmitted. The symbols of the encoding matrix M are then distributed in time and/or in frequency on each of the transmit antennas.

At reception, for each reception antenna, the received signal is multiplied by the inverse matrix (integrating an equalizing technique as understood according to the MMSE or ZF criterion) of the encoding matrix M, in taking account if necessary of the noise introduced by the receiver.

The result is a vector with n dimensions representing the n transmission channels between the n transmit antennas and this reception antenna. This vector with n dimensions is then used by the receiver to estimate the transmission channels. This is done for example by repeating this operation periodically and performing a time and/or frequency interpolation between two reference symbols estimated during this operation. The interpolation is, for example, of a linear or Wiener type.

Figure 1A:
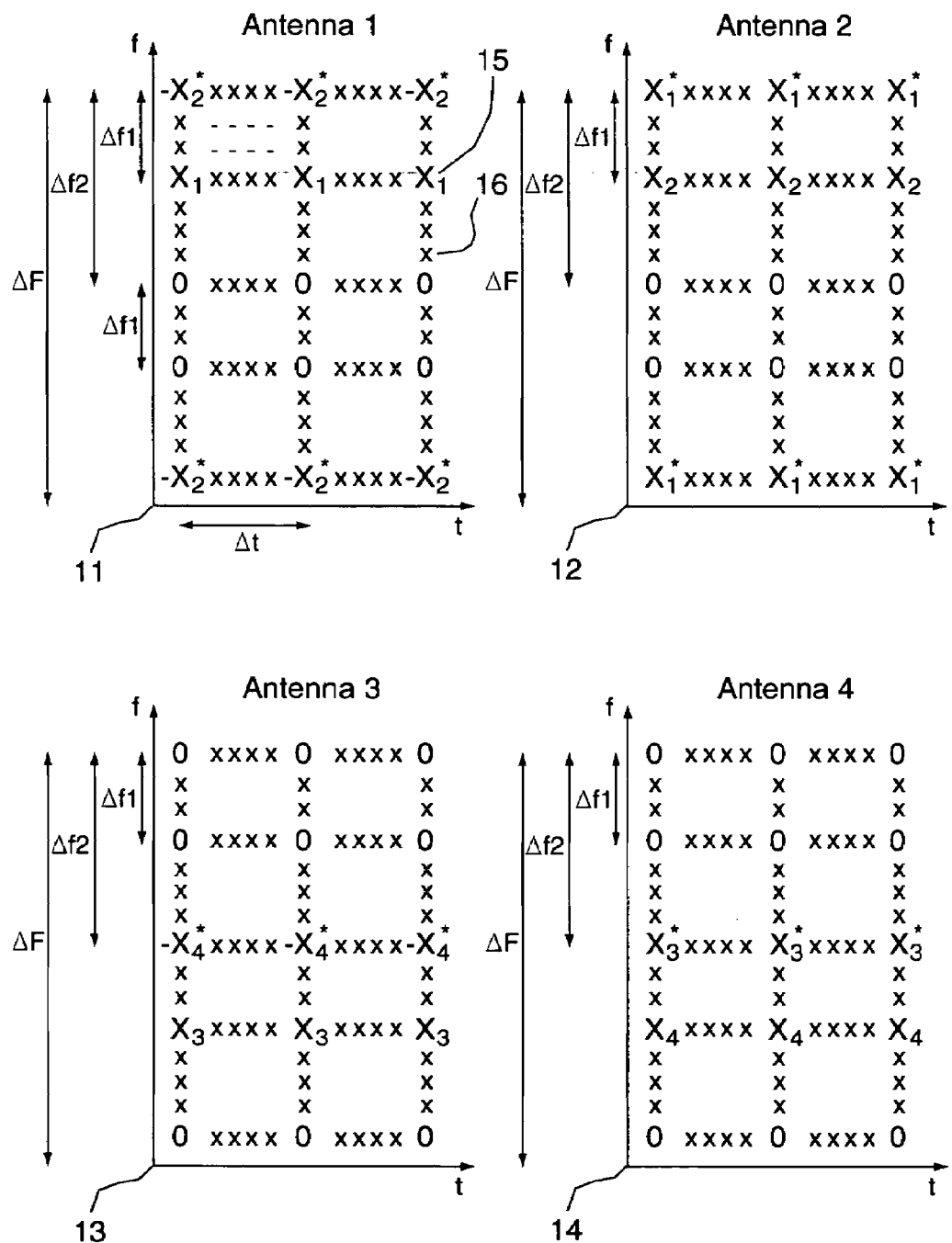
FIGS. 1A and 1B present a system of channel estimation in a multi-antenna system with four transmit antennas, with symbols distributed in the frequency domain (FIG. 1A) or time domain (FIG. 1B) according to a first embodiment of the invention.
Figure 1B:
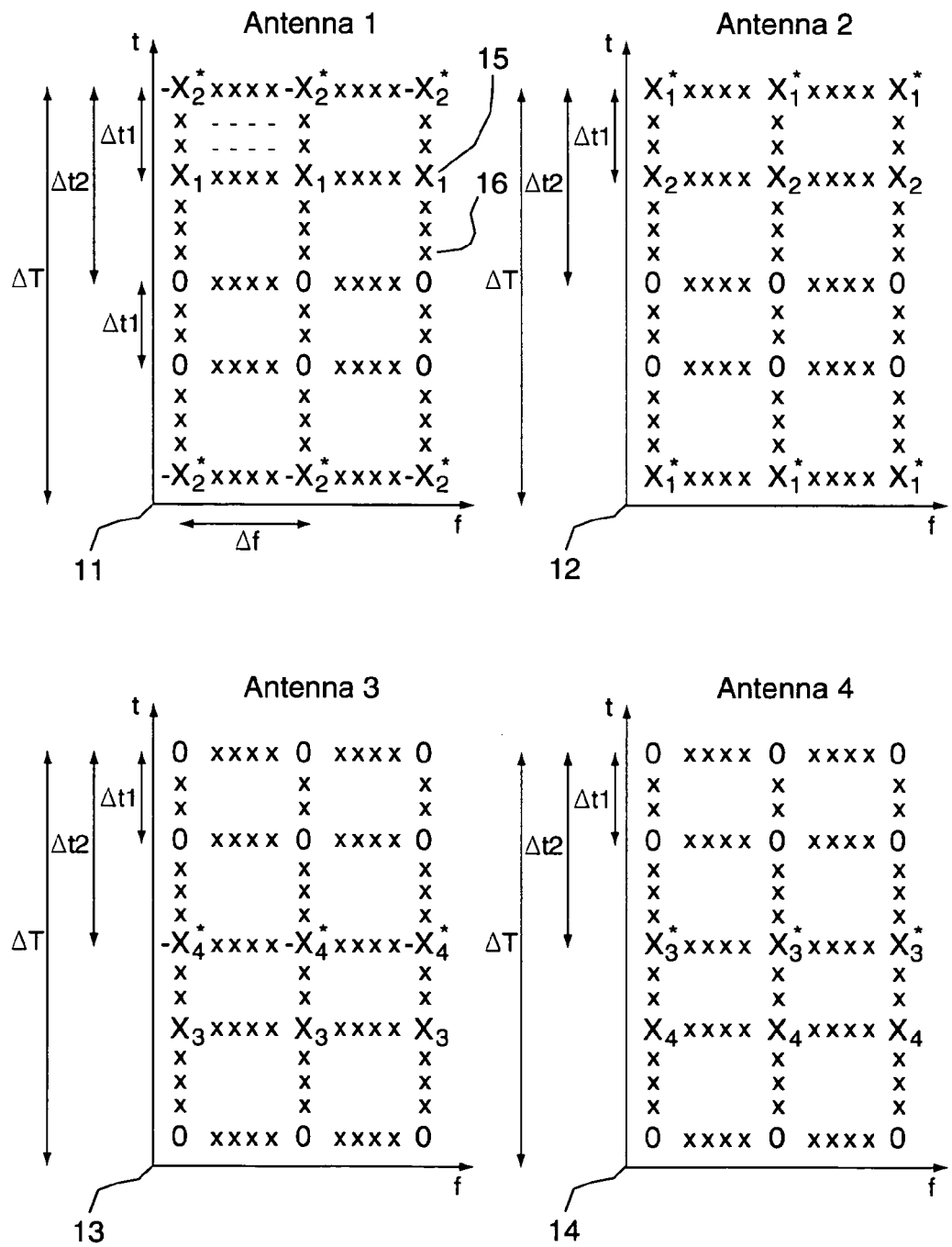

Referring now to FIGS. 1A and 1B, a description is given of a first embodiment of the invention in which it is sought to estimate the transmission channels of a multi-antenna system with four transmit antennas.

According to this first embodiment, the encoding matrix M is a block matrix, each of the blocks comprising n reference symbols. An Alamouti orthogonal space-time encoding is then applied to each block of the encoding matrix M. Each of the blocks of n reference symbols is then orthogonal.

Those skilled in the art will easily extend this teaching to the case where the number of antennas, in transmission and/or in reception, is greater. It is thus possible to apply an Alamouti encoding to each of the blocks of a system with n=4, 6, 8, . . . transmit antennas.

According to this embodiment illustrated in FIGS. 1A and 1B, the Alamouti encoding is applied to the reference symbols used for the estimation of the channel. Then, these encoded reference symbols are transmitted on one pair of antennas while the other pair of antennas is kept powered off.

Thus, if we consider the vector of reference symbols $[x_1\ x_2\ x_3\ x_4]$, the encoding matrix M which for its part is associated by means of the encoding function is:

$$M = \begin{bmatrix} x_1 & x_2 & 0 & 0 \\ -x_2^* & x_1^* & 0 & 0 \\ 0 & 0 & x_3 & x_4 \\ 0 & 0 & -x_4^* & x_3^* \end{bmatrix}$$

where $x_i$ is a reference symbol, $x_i^*$ is a conjugate reference symbol, with i as a relative integer and $1 \leq i \leq 4$, and 0 signifies that no symbol is transmitted on the concerned antenna.

Each block $$\begin{bmatrix} x_1 & x_2 \\ -x_2^* & x_1^* \end{bmatrix} \text{ and } \begin{bmatrix} x_3 & x_4 \\ -x_4^* & x_3^* \end{bmatrix}$$

of the encoding matrix being encoded according to an Alamouti code, we have $M \cdot M^H = I$, with I as the unit matrix, and $^H$ as the conjugate transpose.

The reference symbols of the encoding matrix M are then transmitted after space-frequency distribution (FIG. 1A) or space-time distribution (FIG. 1B) on the different transmit antennas, the space axis representing the columns of the matrix M and the frequency axis (FIG. 1A) or time axis (FIG. 1B) representing the rows of the matrix M.

It is clear that other space-time or space-frequency distributions of the symbols can be envisaged, as also a combination of the space-time and space-frequency distributions.

In fact, each block of the encoding matrix M is transmitted independently on its respective antennas, while the other blocks of the encoding matrix are not transmitted. In other words, each block of reference symbols is transmitted separately, each of the blocks being transmitted on certain transmit antennas while the other antennas are powered off.

Thus, FIG. 1A presents the symbols transmitted by the four antennas 11, 12, 13, 14 of a multi-antenna system with four transmit antennas, the symbols transmitted being distributed in the frequency domain (y-axis) with $X_i$ being a reference symbol referenced 15, $X_i^*$ a conjugate reference symbol (i a relative integer and $1 \leq i \leq 4$), x a data symbol referenced 16, and 0 signifies that no symbol is transmitted.

The symbols transmitted by the four antennas 11, 12, 13, 14 are distributed in the space-frequency domain (FIG. 1A) or space-time domain (FIG. 1B) as a function of the parameters $\Delta F$, $\Delta f_1$, $\Delta f_2$ (FIG. 1A), $\Delta T$, $\Delta t_1$, $\Delta t_2$ (FIG. 1B), representing the repetition patterns of the reference symbols.

The values chosen for $\Delta f$, corresponding to the spacing between two reference carriers (in this example $\Delta f = \{\Delta F, \Delta f_1, \Delta f_2\}$), and for $\Delta t$, corresponding to the spacing between two reference symbols at known points in time (in this example $\Delta t = \{\Delta T, \Delta t_1, \Delta t_2\}$), are not proper to the proposed system but depend on the stationary state of the transmission channel.

In general, the following are assumed:

$\Delta F \ll B_C$, with $B_C$ the coherence band of the channel;

$\Delta T \ll T_C$, with $T_C$ the coherence time of the channel;

$\Delta_1$ verifies at best the frequency stationary state of the channel;

$\Delta t_1$ verifies at best the temporal stationary state of the channel;

$\Delta f_2$ and $\Delta t_2$ depend on a compromise between the loss of spectral efficiency and the performance of the system.

Figure 2A:
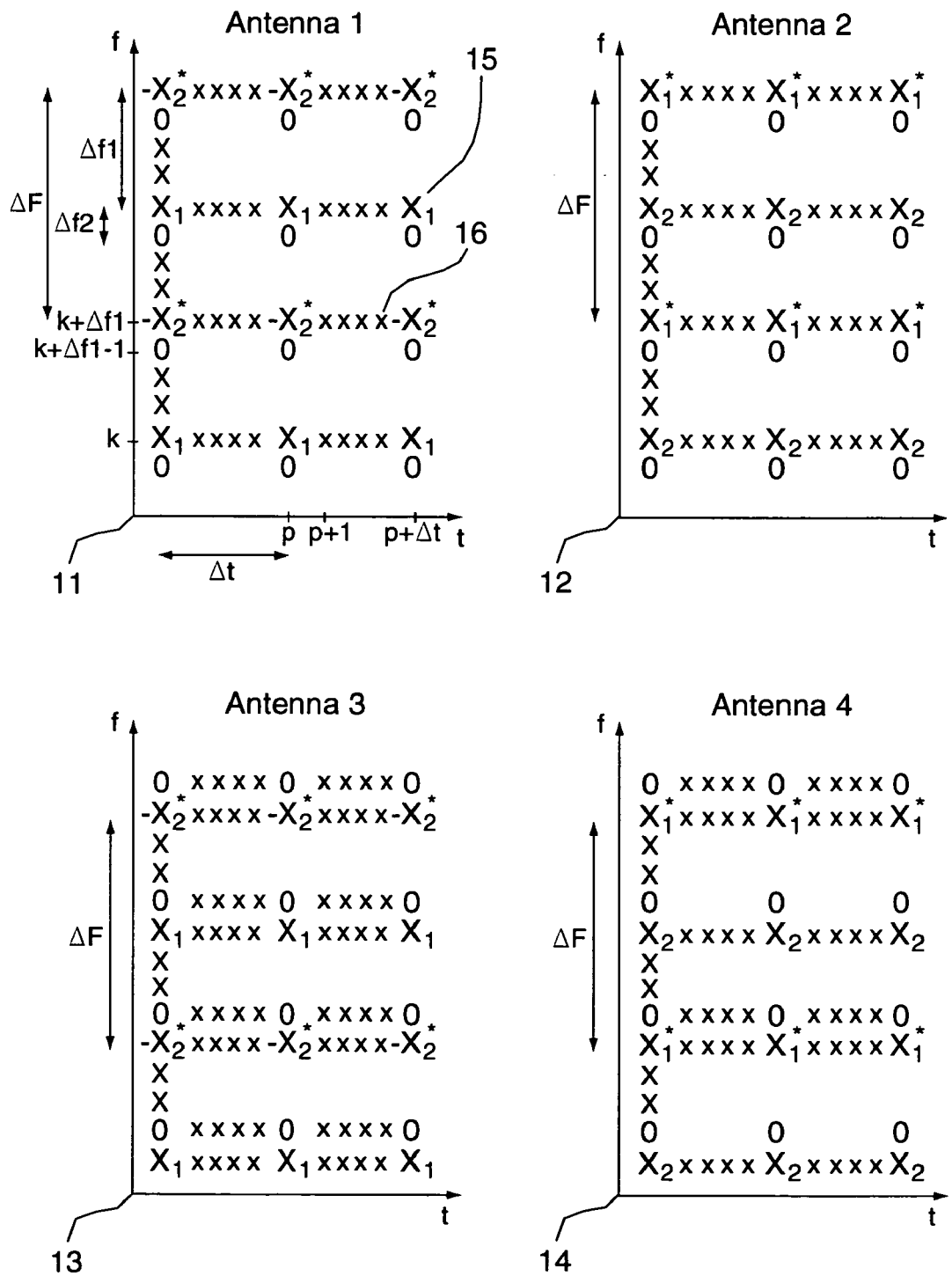
FIGS. 2A and 2B present a particular distribution of the symbols of the channel estimation system of FIGS. 1A and 1B.
Figure 2B:
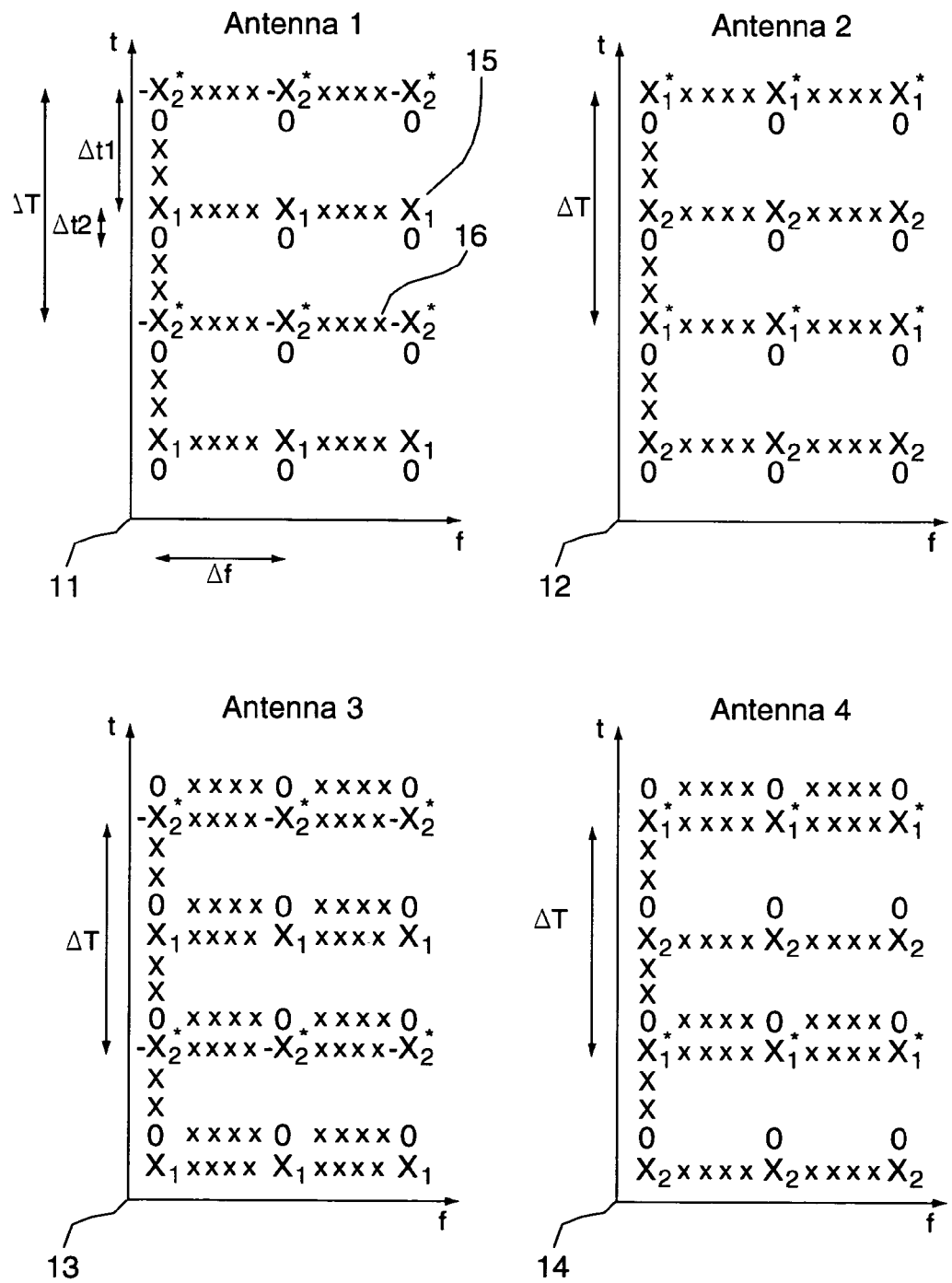

FIGS. 2A and 2B also present another example of the space-time distribution (FIG. 2A) or space-frequency distribution (FIG. 2B) of the symbols in this first embodiment, as a function of the parameters $\Delta F$, $\Delta f_1$, $\Delta f_2$ (FIG. 2A), $\Delta T$, $\Delta t_1$, $\Delta t_2$ (FIG. 2B).

In this example, the values of the reference symbols are chosen so that $X_1 = X_3$ and $X_2 = X_4$.

The reference vector received at the level of a reception antenna, modified by the transmission channel, can then be written in the form $r = Xh + n$, where h corresponds to a modeling of the transmission channel and n is a Gaussian white noise vector.

This received reference vector can also be written in vector form:

$$\begin{bmatrix} r_1 \\ r_2 \\ r_3 \\ r_4 \end{bmatrix} = \begin{bmatrix} x_1 & x_2 & 0 & 0 \\ -x_2^* & x_1^* & 0 & 0 \\ 0 & 0 & x_3 & x_4 \\ 0 & 0 & -x_4^* & x_3^* \end{bmatrix} \begin{bmatrix} h_1 \\ h_2 \\ h_3 \\ h_4 \end{bmatrix} + \begin{bmatrix} n_1 \\ n_2 \\ n_3 \\ n_4 \end{bmatrix}$$

For each of the reception antennas, it is sought to estimate the transmission channel h by applying, to the received reference vector, a mathematical transformation by a decoding matrix, corresponding to the inverse matrix integrating a technique of equalization, in the sense of the MMSE or ZF criterion, of the encoding matrix M.

According to the MMSE criterion, the decoding matrix is formed by the elements:

$$\hat{h} = \frac{M^H}{M^H M + \frac{I}{\gamma}} r,$$

with:
r as said received reference vector;
M said encoding matrix;
I a unitary matrix;
$\gamma$ the signal-to-noise ratio;
$^H$ the conjugate transpose.

According to the ZF criterion, the decoding matrix is formed by the elements:

$$\hat{h} = \frac{M^H}{M^H M} r,$$

with:
r as said received reference vector;
M said encoding matrix;
$^H$ the conjugate transpose.

These two criteria lead to identical results with a high signal-to-noise ratio.

In the case of a ZF criterion, we obtain:

$$\begin{bmatrix} \hat{h}_1 \\ \hat{h}_2 \\ \hat{h}_3 \\ \hat{h}_4 \end{bmatrix} = \begin{bmatrix} \frac{1}{a} & 0 & 0 & 0 \\ 0 & \frac{1}{a} & 0 & 0 \\ 0 & 0 & \frac{1}{b} & 0 \\ 0 & 0 & 0 & \frac{1}{b} \end{bmatrix} \begin{bmatrix} a & 0 & 0 & 0 \\ 0 & a & 0 & 0 \\ 0 & 0 & b & 0 \\ 0 & 0 & 0 & b \end{bmatrix} \begin{bmatrix} h_1 \\ h_2 \\ h_3 \\ h_4 \end{bmatrix} + \begin{bmatrix} \frac{1}{a} & 0 & 0 & 0 \\ 0 & \frac{1}{a} & 0 & 0 \\ 0 & 0 & \frac{1}{b} & 0 \\ 0 & 0 & 0 & \frac{1}{b} \end{bmatrix} M^H n$$

with $a = \sum_{i=1}^{2} |x_i|^2$ and $b = \sum_{i=3}^{4} |x_i|^2$.

It is thus possible to determine the coefficients of the channel at an instant p on a carrier k, at an instant p on a carrier $k + \Delta f_1, \ldots$, as illustrated in FIG. 2A.

By applying a frequency interpolation between the two carriers k and $k + \Delta f_1$ bearing the reference symbols, the receiver can determine the coefficients of the propagation channel at the carriers k, k+1, k+2, ..., $k + \Delta f_1 - 1$, $k + \Delta f_1$.

An interpolation can also be made in the time domain, in considering that the reference symbols are transmitted at the instant p on the carrier k, at the instant $p + \Delta t$ on the same carrier k, .... The receiver can then determine the coefficients of the propagation channel at the instants p, p+1, p+2, ..., $p + \Delta t - 1$, $p + \Delta t$ and so on and so forth.

The receiver can therefore perform a time interpolation and/or a frequency interpolation. This interpolation step implements an interpolation technique well known to those skilled in the art, such as for example a linear type interpolation or a Wiener interpolation.

Since the other pair of antennas does not transmit on the same carriers and at the same instants, as illustrated in FIGS. 1A, 1B, 2A and 2B, the signal transmitted by the first pair of antennas is not disturbed.

Each pair of antennas then alternately transmits the reference symbols distributed on its antennas, so as to estimate all the transmission channels of the multi-antenna system.

According to an embodiment of the invention, it is thus possible to apply orthogonal space-time codes to systems having a greater number of transmit antennas, by means of an encoding matrix M preserving a rate equal to 1. It is thus possible to apply an Alamouti code with a rate equal to 1 to systems having 4, 6, 8, ..., transmit antennas (whereas in the prior art, the number of transmit antennas of the transmission system is limited owing to the use of orthogonal space-time codes).

However, although this channel estimation technique performs better in terms of estimation, since the other groups of antennas are powered off when one group of antennas is transmitting, this technique is accompanied by a loss of spectral efficiency and does not benefit from the total power of the antennas since certain carriers convey no information at defined instants.

A second embodiment of the invention is then presented, wherein the reference symbols are transmitted on all the transmit antennas after mathematical transformation by the encoding matrix M, the encoding matrix M being non-orthogonal.

According to the second embodiment, a Jafarkhani type non-orthogonal space-time encoding, as presented in "A Quasi-Orthogonal Space-Time Block Code" (IEEE Transactions on Communications, Vol. 49, No 1, 2001, pp. 1-4), is applied to the reference symbols used for the estimation of the channel.

This encoding is used especially to transmit signals showing low interference.

Thus, if we consider the vector of reference symbols $[x_1\ x_2\ x_3\ x_4]$, the encoding matrix M associated with it by means of the encoding function is:

$$M = \begin{bmatrix} x_1 & x_2 & x_3 & x_4 \\ -x_2^* & x_1^* & -x_4^* & x_3^* \\ -x_3^* & -x_4^* & x_1^* & x_2^* \\ x_4 & -x_3 & -x_2 & x_1 \end{bmatrix},$$

where $x_i$ is a reference symbol, $x_i^*$ is a conjugate reference symbol with i as a relative integer, $1 \leq i \leq 4$.

All the reference symbols of the encoding matrix M are then transmitted after space/frequency distribution on all the transmit antennas, the spatial axis representing the columns of the matrix M and the frequency or time axis representing the rows of the matrix M.

As described here above, the reference vector received at a reception antenna, modified by the transmission channel, can be written in the form r=Xh+n, where h corresponds to a modeling of the transmission channel and n is a Gaussian white noise vector.

This received reference vector can also be written in vector form:

$$\begin{bmatrix} r_1 \\ r_2 \\ r_3 \\ r_4 \end{bmatrix} = \begin{bmatrix} x_1 & x_2 & x_3 & x_4 \\ -x_2^* & x_1^* & -x_4^* & x_3^* \\ -x_3^* & -x_4^* & x_1^* & x_2^* \\ x_4 & -x_3 & -x_2 & x_1 \end{bmatrix} \cdot \begin{bmatrix} h_1 \\ h_2 \\ h_3 \\ h_4 \end{bmatrix} + \begin{bmatrix} n_1 \\ n_2 \\ n_3 \\ n_4 \end{bmatrix}.$$

Once again, for each of the reception antennas, it is sought to estimate the transmission channel h by the application, to the received reference vector, of a mathematical transformation by a decoding matrix, corresponding to the inverse matrix integrating a technique of equalization in the sense of the MMSE or ZF criterion of the encoding matrix M.

In the case of an MMSE criterion, we get:

$$\begin{bmatrix} \hat{h}_1 \\ \hat{h}_2 \\ \hat{h}_3 \\ \hat{h}_4 \end{bmatrix} = \begin{bmatrix} a+\frac{1}{\gamma} & 0 & 0 & b \\ 0 & a+\frac{1}{\gamma} & -b & 0 \\ 0 & -b & a+\frac{1}{\gamma} & 0 \\ b & 0 & 0 & a+\frac{1}{\gamma} \end{bmatrix}^{-1} \begin{bmatrix} a & 0 & 0 & b \\ 0 & a & -b & 0 \\ 0 & -b & a & 0 \\ b & 0 & 0 & a \end{bmatrix} \cdot \begin{bmatrix} h_1 \\ h_2 \\ h_3 \\ h_4 \end{bmatrix} +$$

$$\begin{bmatrix} a+\frac{1}{\gamma} & 0 & 0 & b \\ 0 & a+\frac{1}{\gamma} & -b & 0 \\ 0 & -b & a+\frac{1}{\gamma} & 0 \\ b & 0 & 0 & a+\frac{1}{\gamma} \end{bmatrix}^{-1} M^H \cdot n$$

with $a = \sum_{i=1}^{4} |x_i|^2$ and $b = 2Re(x_1 x_4^* - x_2 x_3^*)$.

This operation is reiterated identically for each reception antenna, whatever the number of antennas. It is thus possible to determine the coefficients $h_c$ of a transmission channel at a frequency c or at a defined instant c, and all that remains to be done is to apply a time and/or frequency interpolation at the receiver between the estimates of $h_c$ and $h_{c+k}$ (with k=$\Delta$f should c be a frequency and k=$\Delta$t should c be an instant) in order to assess the missing values. Thus, comprehensive knowledge is obtained of all the values of a transmission channel for each of the antennas, thus making it possible to equalize the reception signal conventionally.

According to this second embodiment, it is possible to extend this estimation technique to systems having more than two transmit antennas.

Thus, if we consider the vector of reference symbols $[x_1\ x_2\ \ldots\ x_n]$, the encoding matrix M that is associated with it by means of the encoding function is:

$$M = \begin{bmatrix} x_1 & \cdots & x_n \\ \vdots & \ddots & \vdots \\ x_{N-n+1} & \cdots & x_N \end{bmatrix},$$

where $x_i$ is a reference symbol, with i as a relative integer $1 \leq i \leq N$, and $N=n^2$.

This is a full-ranking matrix so that it can be inverted during the estimation of the different channels.

As described here above, the reference symbols of the encoding matrix M are transmitted after space/frequency distribution on all the transmit antennas, and the reference vector received at a reception antenna, modified by the transmission channel, can be written in the form:

$$\begin{bmatrix} r_1 \\ r_2 \\ r_3 \\ r_4 \end{bmatrix} = \begin{bmatrix} x_1 & x_2 & x_3 & x_4 \\ x_5 & x_6 & x_7 & x_8 \\ x_9 & x_{10} & x_{11} & x_{12} \\ x_{13} & x_{14} & x_{15} & x_{16} \end{bmatrix} \cdot \begin{bmatrix} h_1 \\ h_2 \\ h_3 \\ h_4 \end{bmatrix} + \begin{bmatrix} n_1 \\ n_2 \\ n_3 \\ n_4 \end{bmatrix}.$$

Once again, for each of the reception antennas, the received reference vector receives the application of a mathematical transformation by means of a decoding matrix, corresponding to the inverse matrix integrating a technique of equalization in the sense of the MMSE or ZF criterion of the encoding matrix M in order to estimate the transmission channel h.

If an equalization technique in the sense of the MMSE criterion is used, we get:

$$\begin{bmatrix} \hat{h}_1 \\ \hat{h}_2 \\ \hat{h}_3 \\ \hat{h}_4 \end{bmatrix} = \left[ M^H M + \frac{I}{\gamma} \right]^{-1} M^H \cdot \begin{bmatrix} h_1 \\ h_2 \\ h_3 \\ h_4 \end{bmatrix} + \left[ M^H M + \frac{I}{\gamma} \right]^{-1} M^H n,$$

with $\gamma$ the signal-to-noise ratio.

As described here above, it is then possible to determine the missing coefficients of the transmission channel by applying a time or frequency interpolation (or both) to the receiver in using a classic technique of interpolation.

Figure 3A:
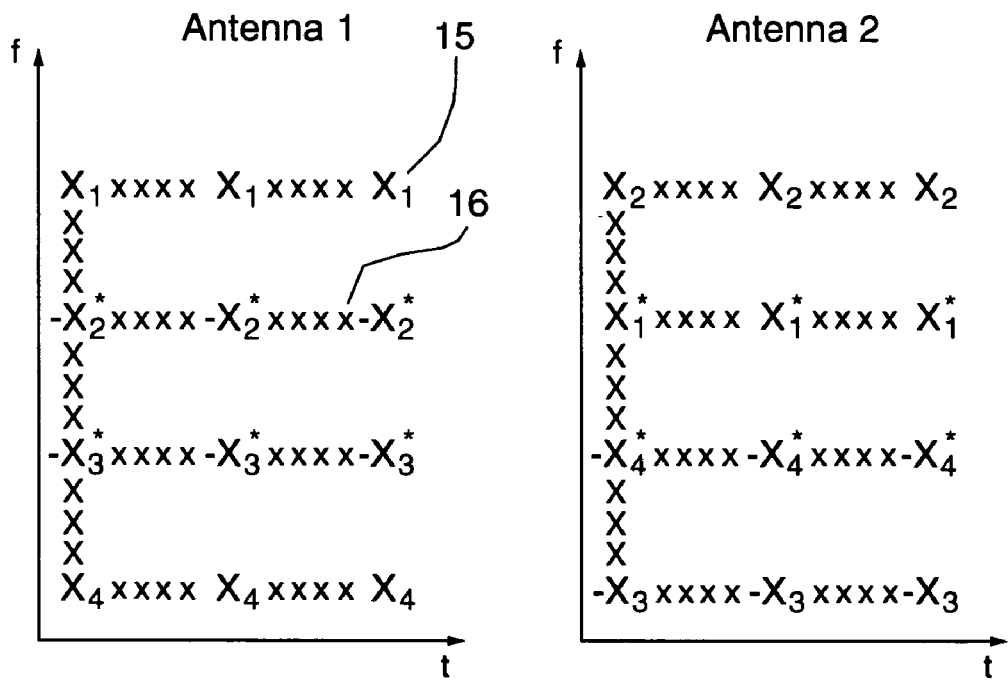
FIGS. 3A and 3B illustrate a system of channel estimation in a multi-antenna system with four transmit antennas, with symbols distributed in the frequency domain (FIG. 3A) or time domain (FIG. 3B) according to a third embodiment of the invention.
Figure 3A:
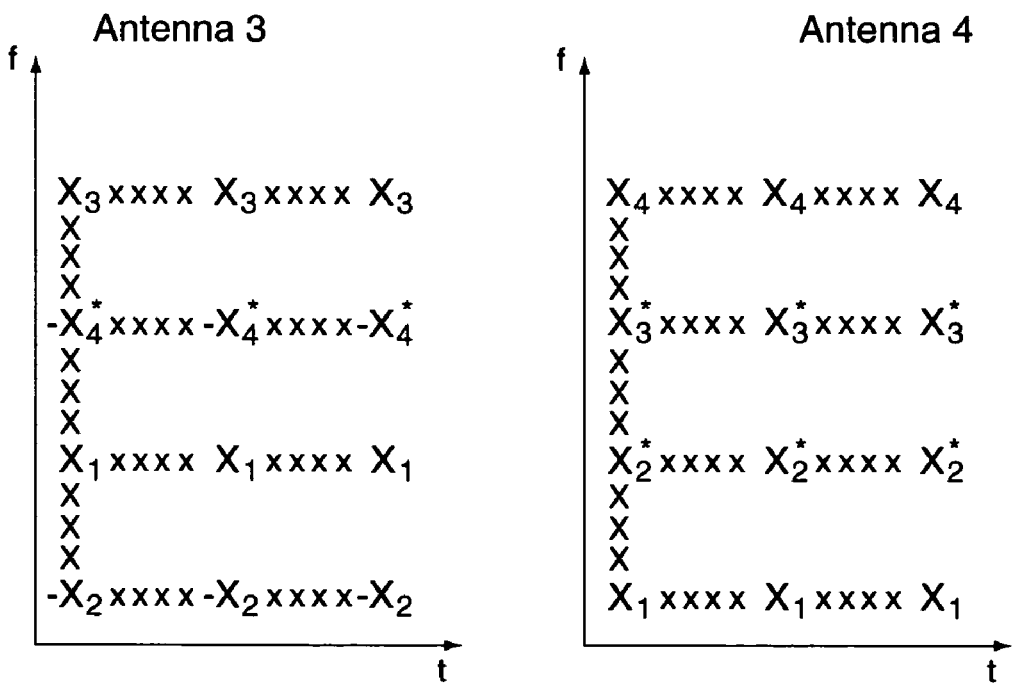
Figure 3B:
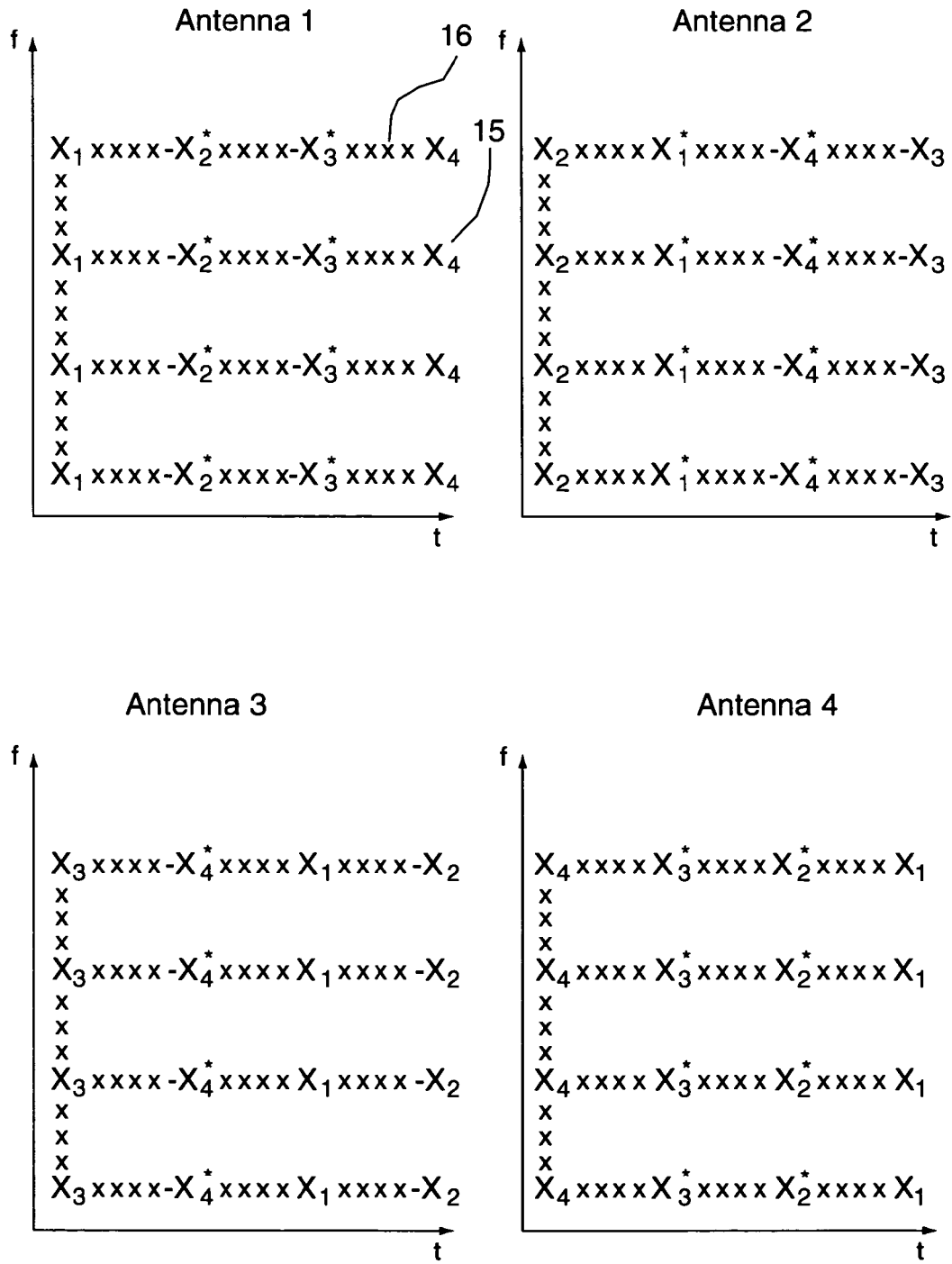

Referring to FIGS. 3A and 3B, we now present a third embodiment of the invention that can be applied more particularly to MIMO type multi-antennas systems.

In this third embodiment, a flexible principle is proposed for the application of either a space-time encoding or a space-frequency encoding, depending on the characteristics of the transmission channel.

Thus, FIG. 3A illustrates the transmission of four reference symbols and their conjugates temporally spaced out, in a multi-antenna system with four transmit antennas with $X_i$ being a reference symbol referenced 15, $X_i^*$ a conjugate reference symbol (i a relative integer and $1 \leq i \leq 4$), x a data symbol, referenced 16.

FIG. 3B illustrates the transmission of four reference symbols and their conjugates spaced out frequentially, in a multi-antenna system with four transmit antennas.

In this third embodiment, the reference symbols, once encoded by means of the encoding matrix M, are distributed along the time axis or frequency axis according to the properties of the propagation channel.

It is then possible to switch from a space-time encoding to a space-frequency encoding.

It may be recalled that the values chosen for $\Delta f$ (spacing between two reference carriers) and $\Delta t$ (spacing between two reference symbols at known instants) are not proper to the proposed system but depend respectively on the band and time of coherence of the transmission channel.

As a general rule, the distribution in the time domain is applied rather in the case of the channel that varies temporally while the frequency distribution is applied more to a channel that varies frequentially.

Thus, with a priori knowledge of the channel or having computed the values of the coherence band or the coherence time of the channel, it is possible to switch between the two structures of insertion of reference symbols described here above.

Those skilled in the art will easily extend the teaching of these three embodiments to systems having a greater number of antennas, as well as to systems having a space-time distribution and/or a space-frequency distribution different from those proposed in FIGS. 1A, 1B, 2A, 2B, 3A and 3B.

Thus, according to an embodiment of the invention, the different transmit antennas transmit, on a same carrier and at a same instant, a signal characterized by a space-time encoding and/or space-frequency encoding, thus limiting the loss of spectral efficiency.

This signal therefore intrinsically comprises the characteristics of an embodiment of the invention.

Finally, a receiver may estimate each of the transmission channels between the different transmit and reception antennas on the basis of this specific encoding and of the appropriate processing described here above. The particular channel estimation technique proposed according to an embodiment of the invention may therefore be applied in the case of a system having two transmit antennas.

An embodiment of the invention provides a technique for the estimation of transmission channels in a multi-antenna system implementing more than two transmit antennas.

An embodiment of the invention proposes a technique of this kind that is more efficient and performs better than the prior-art techniques while having lower complexity.

An embodiment of the invention provides a technique of transmission of a signal comprising reference symbols implementing a space-time encoding and/or space-frequency encoding matrix. In particular, an embodiment of the invention provides a unit-rate encoding matrix.

An embodiment provides a technique of this kind that is adapted to MISO or MIMO type multi-antenna systems for single-carrier or multi-carrier type modulations combined with the different techniques of multiple access, namely CDMA (Code Division Multiplex Access), FDMA (frequency division multiple access) or TDMA (time division multiple access).

An embodiment of the invention proposes a technique of this kind that can be used to augment the spatial diversity of the systems while at the same time reducing interference between the different transmission channels to the minimum and limiting the loss of spectral efficiency.

In other words, an embodiment of the invention provides a technique of this kind that can be implemented in a practical and low-cost manner in a system implementing a large number of antennas.

Although the present disclosure has been described with reference to preferred embodiments, workers skilled in the art will recognize that changes may be made in form and detail without departing from the spirit and scope of the disclosure.

The invention claimed is:

1. Method of estimation of the transmit channels in a multi-antenna system implementing n transmit antennas, where n is strictly greater than 2, and at least one reception antenna, according to which n vectors to be transmitted respectively by each of said transmit antennas are associated with a vector of source data, by an encoding matrix M of rate equal to 1, implementing reference symbols known to at least one receiver and enabling this receiver to estimate n transmit channels corresponding respectively to each of said transmit antennas, wherein the method comprises:

receiving a received reference vector, corresponding to a transmitted reference vector obtained by mathematically transforming reference symbols by said encoding matrix M, and modified by at least one transmission channel for each of said transmit antennas; and for each of said reception antennas, mathematically transforming said received reference vector by a decoding matrix, which is the inverse of said encoding matrix and takes account of the effect of a transmission channel associated with said reception antenna, to give an estimation of the effects of said transmit channels on said reference symbols.

2. Method of estimation according to claim 1, wherein said decoding matrix is an inverse matrix integrating an equalization in the sense of the MMSE or ZF criterion.

3. Method of estimation according to claim 2, wherein said criterion implemented is the MMSE criterion and said decoding matrix is formed by the elements:

$$\hat{h} = \frac{M^H}{M^H M + \frac{I}{\gamma}} r,$$

with:
r being the received reference vector;
M the encoding matrix;
I a unitary matrix;
$\gamma$ the signal-to-noise ratio;
$^H$ the conjugate transpose.

4. Method of estimation according to claim 2, wherein said criterion implemented is the ZF criterion and in that said decoding matrix is formed by the elements:

$$\hat{h} = \frac{M^H}{M^H M} r,$$

with:
r being said received reference vector;
M said encoding matrix;
$^H$ the conjugate transpose.

5. Method of estimation according to claim 1, and further comprising an interpolation step delivering an estimation of said transmission channels, for each of the source data, from the estimation of the reference symbols.

6. Method of estimation according to claim 5, wherein said interpolation step implements a temporal interpolation and/or a frequency interpolation.

7. Method of estimation according to claim 5 wherein said interpolation step belongs to the group comprising:
linear interpolations;
Wiener interpolations.

8. Reception device in a multi-antenna system, implementing n transmit antennas, where n is strictly greater than 2, and at least one reception antenna in which n vectors to be transmitted respectively by each of said transmit antennas are associated with a vector of source data, an encoding matrix M of rate equal to 1, implementing reference symbols known to said receiver and enabling this receiver to estimate n transmit channels corresponding respectively to each of said transmit antennas, wherein the reception device comprises:

a receiver, which receives a received reference vector, corresponding to a transmitted reference vector obtained by mathematically transforming reference symbols by said encoding matrix M, and modified by at least one transmission channel for each of said transmit antennas, and a decoder which, for each of said reception antennas, mathematically transforms said received reference vector by a decoding matrix, which is the inverse of the encoding matrix and takes account of the effect of a transmission channel associated with said reception antenna, to give an estimation of the effects of said transmit channels on said reference symbols.

9. Reception device according to claim 8, wherein the device forms or is integrated into at least one of the installations belonging to the group comprising:
a base station;
a terminal.

* * * * *